United States Patent Office 3,470,217
Patented Sept. 30, 1969

3,470,217
PROCESS FOR THE PREPARATION OF
ALKYNYL CARBINOLS
Robert Ginsig, Mexico City, Mexico, assignor to Syntex Corporation, Panama, Panama, a corporation of Panama
No Drawing. Filed Apr. 7, 1966, Ser. No. 540,815
Int. Cl. C07c *167/00*
U.S. Cl. 260—397.4          18 Claims

ABSTRACT OF THE DISCLOSURE

Preparation of 17β-hydroxy-17α-ethynyl steroids, useful as estrogenic and progestational agents, from the corresponding 17-keto steroids by allowing the latter to react with acetylene in the presence of an alkali metal alkoxide and dialkylsulfoxide.

---

The present invention is directed at a novel process in organic chemistry. More particularly, the present invention concerns a valuable synthetic route for the preparation of carbinols. Specifically, this process pertains to an inexpensive, convenient and improved route for the preparation of alkynyl carbinols from aliphatic or alicyclic carbonyl derivatives.

Among the commercially feasible processes for the preparation of alkynyl carbinols such as the hypnotics meparfynol (3-methylphentyn-3-ol) and ethchlorvynol (ethyl-β-chlorovinyl ethynyl carbinol), synthetic steroidal hormones such as 17α-ethynylestr-4-en-17β-ol-3-one, 17α-ethynylestr-5(10)-en-17β-ol-3-one, and 3-methoxy-17α-ethynylestra-1,3,5(10)-trien-17β-ol, and various commercial chemical intermediates such as 3-methylbutyn-1-ol used in the preparation of isoprene, is the alkynylation of aliphatic or alicyclic carbonyl compounds. Heretofore the formation of a sufficiently anionic reaction specie of the alkyne reactant has required utilization of an extremely strong base such as an alkali metal t-alkoxide, an alkali metal amide, or even an alkali metal itself such as lithium or sodium often in a reaction medium such as liquid ammonia. In addition to the obvious cost and danger of such reagents, such strong bases increase considerably the possibility of undesired side reactions.

The present invention is based on the discovery that under certain conditions, more fully defined hereafter, the formation of carbinols through the alkynylation of carbonyl compounds may be successfully accomplished in the presence of basic materials which are less alkaline. These materials are less dangerous to use, from the standpoint of both operator and undesired side reactions, and less expensive than those previously in use.

According to the present invention, an aliphatic or alicyclic ketone is treated with the reaction product obtained from an alkali metal lower alkoxide, a hydrocarbon sulfoxide and from an acidic alkyne. By the term "acidic alkyne" is simply meant an acetylenic compound having a hydrogen atom bound to at least one of the carbon atoms bearing the triple bond, as for example acetylene or a monosubstituted acetylene derivative such as methylacetylene, ethylacetylene, or the like.

By the term "alkali metal alkoxide" is intended an ionic substance having as its cation an alkali metal ion, e.g., sodium, potassium or lithium, and as its anion the deprotonated residue of a hydrocarbon alcohol of from 1 to about 7 carbon atoms. While this alcohol moiety may contain from 1 to 7 carbon atoms, availability, cost and reactivity presently favor those primary and secondary alcohols of lower molecular weight such as methanol, ethanol, propanol and isopropanol, particularly methanol and ethanol. Thus, as highly satisfactory alkali metal alkoxides may be mentioned: sodium methoxide, potassium methoxide, sodium ethoxide and potassium ethoxide.

The hydrocarbon sulfoxide may be of any of the known sulfoxides such as methylethylsulfoxide, diethylsulfoxide, dimethylsulfoxide, etc. Again, on the basis of availability, cost and reactivity, dimethylsulfoxide is presently preferred.

In practice, the acidic alkyne is first introduced into a substantially nonaqueous, preferably anhydrous, mixture of the alkali metal lower alkoxide and the hydrocarbon sulfoxide. While this initial medium may consist solely of the alkoxide and sulfoxide, the latter thus serving as the solvent, it is often desirable to provide an additional solvent component in the form of one or more inert, organic liquids. For this purpose, any organic liquids which are free from acidic hydrogen atoms may be used, the selection depending in part on the solubilities and chemical reactivity of the present and future reactants. Among numerous such solvents are included: diethyl ether, dioxane, tetrahydrofuran, diglyme, benzene, toluene, xylene, and the like.

Thus, the mixture of the alkali metal alkoxide and the sulfoxide is first saturated with acidic alkyne. After allowing this mixture to equilibrate, the carbonyl compound is introduced. For ease of handling and homogenicity of the reaction mixture, the carbonyl derivative is ideally dissolved in an inert organic solvent, generally the same solvent as is used for a cosolvent as described above, if such is employed. Often the reaction can be advantageously executed without temperature adjustment, i.e., it is successful at a typical room temperature of about 25° C. Should the reaction be overly vigorous or sluggish, as the case may be, cooling or heating respectively may be applied as appears necessary.

Alternatively in some applications, it is desirable to first place the carbonyl reactant in a mixture of the alkoxide and the sulfoxide and then introduce the alkyne.

For maximization of yields, it has been found desirable to continue introduction of the alkyne during the reaction, thus providing an excess of this reagent. At initiation, therefore, one should utilize an amount of alkali metal lower alkoxide which is at least equimolar to the amount of carbonyl derivative to be introduced, and preferably an excess such as 2 to 10 molar equivalents. One highly satisfactory ratio is about 5 molar equivalents of alkoxide for each molar unit of carbonyl derivative.

Upon completion of the reaction, the period for which will obviously depend on the particular reactants but which generally is from 1 to 10 hours, e.g., 3 to 5 hours with a suitable rate of introduction of the acidic alkyne, the reaction product is acidified prior to isolation. This is readily accomplished, for example, by merely pouring the reaction medium into an aqueous solution of acid, such as sulfuric, hydrochloric, acetic, or the like acid. To overcome the heat of neutralization, this aqueous acid medium may also contain ice, or it may be cooled externally. The reaction solvent is then removed by conventional methods such as evaporation, physical separation, vacuum distillation, or the like. The reaction product is then collected, if insoluble, by filtration, centrifugation or the like, or if soluble, by evaporation and concentration, solvent extraction or other equivalent conventional methods. Purification via the usual techniques, e.g., recrystallization, distillation and the like may next follow, or the reaction product may be utilized as such, depending upon the ultimate use of the particular material.

As but one example of the utility of this process, reference may be made to the preparation of numerous valuable pharmaceuticals. For instance, ethynylated steroids find wide use as estrogenic and progestational agents, notable among these compounds being the 17α-ethynyl and 17α-chloroethynyl derivatives of the androstane, estrane and gonane series. Through utilization of the foregoing process it is possible to readily ethynylate the 17-keto group of various steroids in a more economical and safer fashion than theretofore possible and to do so selectively even in the presence of other ketone groups which are less reactive. Thus, the present process permits ethynylation of only the 17-keto group in steroids additionally possessing a keto group in conjugation with unsaturation, such as a 3,17-diketo-$\Delta^4$-steroid or a 3,17-diketo-$\Delta^1$-steroid, a keto group with $\beta,\gamma$-unsaturation and a hydrogen atom on the α-carbon atom, such as in a 3,17-diketo-$\Delta^5$-steroid or a 3,17-$\Delta^{5(10)}$-steroid and/or a sterically hindered keto group such as in an 11,17-diketo steroid.

The starting steroid may contain a wide variety of other substituents elsewhere in the molecule, such as alkyl groups, halogen atoms, unsaturation, hydroxy groups, ether groups, and so forth. Of course, other keto groups or aldehyde groups which are reactive, i.e., those which are not deactivated or sterically hindered, should be protected as through the selective formation of ketals, semicarbazones or other art recognized equivalent techniques.

Among suitable steroidal starting materials are thus included 3-hydroxyestra-1,3,5(10)-trien-17-one, 3-methoxyestra-1,3,5(10)-trien-17-one, androst-4-ene-3,17-dione, androst-5-en-3,17-dione, androst-5-en-3,17-dione, androst-4-en-3,11,17-trione, androst-1-ene-3,17-dione, estr-4-ene-3,17-dione, 6α-methylandrost-4-ene-3,17-dione, 18-methylestr-4-ene-3,17-dione, estra-4,9,11-triene-3,17-dione, 18-methylestra-4,9,11-triene-3,17-dione, estr-5(10)-en-3β-ol-17-one, estr-5-en-3β-ol-17-one, estr-5(10)-ene-3,17-dione, estr-5-ene-3,17-dione, and the like. By utilizing the process of the present invention, i.e., alkynylating with for example acetylene, sodium or potassium methoxide, and dimethylsulfoxide, with or without an inert organic solvent such as dioxane or tetrahydrofuran, one can thus readily prepare in excellent yield the corresponding 17α-ethynyl-17β-hydroxy derivatives.

Under the conditions of the acidification step of the present invention certain acid labile groups such as enol ethers and ketals are readily removed. Thus, for example, enol ethers such as 3-ethoxy-$\Delta^{3,5}$-steroids or 3-methoxy-$\Delta^{2,5(10)}$-steroids will be advantageously hydrolyzed at this stage to the corresponding ketones, e.g., a 3-keto-$\Delta^5$-steroid and a 3-keto-$\Delta^{5(10)}$-steroid, respectively, for the two examples given above. Thus, when the starting compound bears an enol ether or ketal, either as a result of previous and specific formation or when formed in the course of previous synthetic routes as for example the product of a Birch reduction, regeneration of the keto group is automatically performed in the course of the overall ethynylation process of the present invention. In the case of 3-keto-$\Delta^5$-steroids and 3-keto-$\Delta^{5(10)}$-steroids, these may be converted to the corresponding conjugated compounds, i.e., a 3-keto-$\Delta^4$-steroid, via a conventional brief treatment under more acidic conditions, e.g., refluxing for an hour or two in alcoholic acid, e.g., methanolic hydrochloric acid.

Moreover, the conditions of the present invention permit in certain instances the realization of other desirable steroid transformations in addition to the principal one of ethynylation. Thus, for example, the important class of 19-norsteroids, such as norethindrone, norethynodrel and esters thereof, are generally obtained via a route utilizing as intermediates 19-oxygenated compounds, e.g., androstanes having a hydroxy, aldehyde or carboxylic acid group in the 19-position. Generally, the hydroxy or aldehyde group is oxidized to the carboxylic acid as with Jones reagent, and the latter is then removed by treatment with acid to yield $\Delta^{5(10)}$-19-norsteroids. It has been discovered that when 19-hydroxy- or 19-aldehyde-17-keto steroids are subjected to the process of this invention, not only is 17α-alkynylation realized, but the hydroxy or aldehyde group is eliminated, thus rendering unnecessary the usual oxidative step in the overall synthetic route. In such cases, it is generally preferable to add the 19-hydroxy compound or 19-aldehyde to a mixture of the alkali metal alkoxide, the sulfoxide and, if utilized, the solvent and to add the alkyne to this mixture. Moreover, the final acidification step of the present invention, in addition to producing the free 17β-hydroxy-17α-ethynyl derivative, can also be used to simultaneously effect decarboxylation of a 19-carboxylic acid derivative. Thus, upon introducing the reaction product of the alkynylation into aqueous acid, a 19-carboxylic acid group is eliminated. The crude product is thus predominantly the 17α-ethynyl-17β-hydroxy-$\Delta^{5(10)}$-19-norsteroid, which when also bearing a 3-keto group may be converted to the corresponding 3-keto-17α-ethynyl-17β-hydroxy-$\Delta^4$-steroid through further acid treatment as described above. This acid treatment also insures complete decarboxylation.

The following examples will serve to further typify the nature of this invention, but as these are presented solely for purposes of illustration, they should not be considered as a limitation on the scope or applicability of the invention.

EXAMPLE 1

Through a stirred suspension of 100 g. of sodium methoxide in 80 ml. of dimethylsulfoxide at room temperature, there is passed a slow stream of purified acetylene over a period of 30 minutes. There is then added a solution of 100 g. of 3-methoxyestra-1,3,5(10)-trien-17-one in 1.5 liters of anhydrous tetrahydrofuran. The introduction of acetylene is continued for three hours. At the end of this time, the reaction mixture is poured into 4 liters of water containing 20 ml. of concentrated sulfuric acid. The tetrahydrofuran is evaporated and the solid which forms is collected by filtration, washed with water to neutrality and air dried. This material is clarified with charcoal and recrystallized from acetone to yield 3-methoxy-17α-ethynylestra-1,3,5(10)-trien-17β-ol, M.P. 159–160° C.; $[\alpha]_D+5°$ (dioxane). Execution of the foregoing process yielded 95 g. of pure product after recrystallization.

EXAMPLE 2

To a stirred suspension of 100 g. of sodium ethoxide in 1 liter of dimethylsulfoxide, previously saturated with acetylene as described in Example 1, is added a solution of 100 g. of 3-hydroxyestra-1,3,5(10)-trien-17-one in 2 liters of anhydrous tetrahydrofuran. Introduction of a slow stream of acetylene through the stirred reaction mixture at room temperature is maintained for four hours. The product is then isolated and purified in accordance with the technique described in Example 1, thus yielding 17α-ethynylestra-1,3,5(10)-triene-3,17β-diol, M.P. 182–183° C.; $[\alpha]_D+7°$ (dioxane). The foregoing process yielded 80 g. of product after recrystallization.

EXAMPLE 3

A solution of 100 g. of 3,3-dimethoxyestr-5(10)-en-17-one in 1.5 liters of dioxane is added to a stirred suspension of 100 g. of sodium methoxide in 800 ml. of dimethylsulfoxide previously saturated with acetylene as described in Example 1. Through the stirred reaction mixture is then bubbled a stream of acetylene. After maintaining these conditions for five hours, at room temperature, the mixture is poured into 4 liters of water containing 50 ml. of acetic acid. This mixture is concentrated to one-third its volume and is extracted with ethyl acetate. These extracts are evaporated to dryness in vacuo and the residue, consisting primarily of 17α-ethynylestr-5(10)-en-17β-ol-3-one, M.P. 178–180° C., is dissolved in 800 ml. of methanol. Eight ml. of concentrated hydrochloric acid are then added, and this mixture is refluxed for one hour. It is then diluted with ice water, and the thus-formed solid is collected by filtration, washed with water to neutrality and air dried. Upon crystallization from acetone there is obtained 17α-ethynylestr-4-en-17β-ol-3-one, M.P. 200–207° C.; $[\alpha]_D$ —30° (dioxane). In one such run there was obtained a yield of 90.5 g. of product after crystallization.

EXAMPLE 4

To a suspension of 15 g. of sodium methoxide in 30 ml. of dimethylsulfoxide, previously saturated with acetylene as described above, there is added a solution of 10 g. of androst-4-ene-3,17-dione in 30 ml. of anhydrous tetrahydrofuran. The reaction mixture is treated with a stream of acetylene as described in Example 1 for two and one-half hours under stirring and is then poured into 400 ml. of water containing 12 ml. of sulfuric acid. The tetrahydrofuran is then eliminated by evaporation under vacuum, and the solid which forms is collected by filtration, washed with water to neutrality and air dried. Crystallization from acetone then yields 17α-ethynylandrost-4-en-17β-ol-3-one, M.P. 268–271° C.; $[\alpha]_D$+31° (pyridine); $\lambda_{max}$ 240 m$\mu$ (log $\epsilon$ 4.20). In one such preparation a yield of 8.5 g. was obtained.

EXAMPLE 5

Through a stirred suspension of 15 g. of sodium methoxide in 60 ml. of dimethylsulfoxide is bubbled a slow stream of propyne for 20 minutes. There is then added a solution of 5 g. of 6α-methylandrost-4-ene-3,17-dione in 50 ml. of anhydrous tetrahydrofuran. The introduction of propyne is continued for eight hours longer with stirring, and the product is then isolated in accordance with the technique described in Example 4, thus producing 6α-methyl-17α-propyn-1-ylandrost-4-en-17β-ol-3-one.

EXAMPLE 6

The procedure of Example 1 is repeated using, however, benzene in a quantity of 2 liters as the steroid solvent. Substantially the same yield of the desired product, 3-methoxy-17α-ethynylestr-1,3,5(10)-trien-17β-ol, is obtained.

Extending the reaction time of the procedure of Example 1 to ten hours similarly yields the same results.

EXAMPLE 7

By following the method described in Example 1, the compounds listed under I are converted into the corresponding ethynyl derivatives listed under II:

| I | II |
|---|---|
| 1-methyl-3-methoxyestra-1,3,5(10)-trien-17-one. | 1-methyl-3-methoxy-17α-ethynylestra-1,3,5(10)-trien-17β-ol. |
| Androst-5-en-3β-ol-17-one | 17α-ethynylandrost-5-ene-3β,17β-diol. |
| Androsta-1,4-diene-3,17-dione | 17α-ethynylandrost-1,4-dien-17β-ol-3-one. |
| 9α-fluoroandrosta-1,4-dien-11β-ol-3,17-dione. | 9α-fluoro-17α-ethynylandrosta-1,4-diene-11β,17β-diol-3-one. |
| 6α-fluoroandrost-4-ene-3,17-dione | 6α-fluoro-17α-ethynylandrost-4-en-17β-ol-3-one. |
| Androstane-3β,17β-diol-6-one | 6α-ethynylandrostane-3β,6β,17β-triol. |
| Estr-5(10)-en-3β-ol-17-one | 17α-ethynylestr-5(10)-ene-3β,17β-diol. |
| Estra-4,9,11-triene-3,17-dione | 17α-ethynylestra-4,9,11-trien-17β-ol-3-one. |
| 18-methylestr-4-en-3,17-dione | 17α-ethynyl-18-methylestr-4-en-17β-ol-3-one. |
| 5α-bromo-6β,19-oxido-5α-androstan-3β-ol-17-one. | 5α-bromo-6β,19-oxido-17α-ethynyl-5α-androstane-3β,17β-diol. |

EXAMPLE 8

In accordance with the method described in Example 4, starting from androst-4-ene-3,11,17-trione, 5α-androst-1-ene-3,17-dione and 6α-methylandrost-4-ene-3,17-dione, there are respectively obtained: 17α-ethynylandrost-4-en-17β-ol-3,11-dione, 17α-ethynyl-5α-androst-1-en-17β-ol-3-one and 6α-methyl-17α-ethynylandrost-4-en-17β-ol-3-one.

EXAMPLE 9

By subjecting estr-5(10)-ene-3,17-dione and 3,3-diethoxyestr-5(10)-en-17-one to the procedure of Example 3, there is obtained in both cases upon the hydrolysis in aqueous acetic acid, 17α-ethynylestr-5(10)-en-17β-ol-3-one which is converted to 17α-ethynylestr-4-en-17β-ol-3-one with methanolic hydrochloric acid as therein described.

When 3-ethoxyestr-3,5-dien-17-one and 3-methoxyestr-2,5(10)-dien-17-one are each utilized in the procedure of Example 3, there is first obtained 17α-ethynylestr-5-en-17β-ol-3-one and 17α-ethynylestr-5(10)-en-17β-ol-3-one, respectively, both of which yield 17α-ethynylestr-4-en-17β-ol-3-one when refluxed in methanolic hydrochloric acid as described in Example 3.

EXAMPLE 10

A solution of 100 g. of androst-4-ene-19-al-3,17-dione in 1 liter of tetrahydrofuran is added with stirring to a suspension of 100 g. of sodium methoxide in 800 ml. of dimethylsulfoxide over a period of 30 minutes. A stream of acetylene is then bubbled through this mixture over a period of five hours. At the end of this time, the reaction mixture is poured into 4 liters of water containing 350 ml. of concentrated hydrochloric acid. This aqueous mixture is concentrated to about one-third of its original volume and is then extracted with ethyl acetate. These extracts are evaporated under reduced pressure, and the residue is dissolved in 800 ml. of methanol containing 8 ml. of concentrated hydrochloric acid. After refluxing this mixture for about one hour, it is poured into ice water. The solid which forms is collected by filtration, washed with water to neutrality and air dried to yield 17α-ethynylestr-4-ene-17β-ol-3-one, which may be recrystallized from ethyl acetate. Utilizing the foregoing procedure, there was obtained the yield of 90 g. of the indicated product, whose properties were in agreement with an authentic sample.

EXAMPLE 11

A solution of 100 g. of androst-4-ene-3,17-dion-19-oic acid in 1 liter of tetrahydrofuran is added to a suspension of 100 g. of sodium methoxide in 800 ml. of dimethylsulfoxide which has been previously saturated with acetylene in the manner as previously described in Example 1. This mixture is stirred for five hours at room temperature, continuing the introduction of acetylene, and is then poured into 4 liters of water containing 350 ml. of hydrochloric acid. The mixture is then concentrated to one-third its original volume and is extracted with ethyl acetate. These extracts are evaporated to dryness under reduced pressure and the residue is dissolved in 800 ml. of methanol containing 8 ml. of hydrochloric acid. After refluxing this mixture for about one hour, it is poured into ice water. The solid which thus forms is collected by filtration, washed with water to neutrality and air dried to yield 17α-ethynylestr-4-ene-17β-ol-3-one, which may be further purified through recrystallization from acetone. Utilizing the foregoing procedure, there was obtained a yield of 91 g. of the indicated product, whose properties were in agreement with an authentic sample.

EXAMPLE 12

By subjecting 19-hydroxyandrostan-4-ene-3,17-dione to the procedure of Example 10, there is obtained 17α-ethynylester-4-ene-17β-ol-3-one. In one experiment there was obtained from 100 g. of starting material, 80 g. of the indicated product.

What is claimed is:

1. The process for the preparation of a 17α-ethynyl-17β-hydroxy steroid which comprises treating a 17-keto steroid with acetylene in the presence of an alkali metal lower alkoxide, a dialkylsulfoxide and an inert nonaqueous organic solvent.

2. The process for the preparation of a 17α-ethynyl-17β-hydroxy steroid which comprises treating a 17-keto steroid with acetylene in the presence of sodium methoxide, dimethylsulfoxide and in inert nonaqueous organic solvent.

3. The process of claim 2 wherein the inert nonaqueous organic solvent is tetrahydrofuran.

4. The process of claim 2 wherein the 17-keto steroid is 3-methoxyestra-1,3,5(10)-trien-17-one and the 17α-ethynyl-17β-hydroxy steroid is 3-methoxy-17α-ethynyl-estra-1,3,5(10)-trien-17β-ol.

5. The process of claim 2 wherein the 17-keto steroid is estra-1,3,5(10)-trien-3-ol-17-one and the 17α-ethynyl-17β-hydroxy steroid is 17α-ethynylestra-1,3,5(10)-triene-3β,17β-diol.

6. The process of claim 2 wherein the 17-keto steroid is estr-4-ene-3,17-dione and the 17α-ethynyl-17β-hydroxy steroid is 17α-ethynylestr-4-en-17β-ol-3-one.

7. The process of claim 2 wherein the 17-keto steroid is estra-5(10)-en-3β-ol-17-one and the 17α-ethynyl-17β-hydroxy steroid is 17α-ethynylestr-5(10)-ene-3β,17β-diol.

8. The process of claim 2 wherein the 17-keto steroid is estr-5(10)-en-3β-ol-17-one and the 17α-ethynyl-17β-hydroxy steroid is 17α-ethynylestr-5(10)-en-17β-ol-3-one.

9. The process of claim 8 including the step of heating said 17α-ethynylestr-5(10)-en-17β-ol-3-one with methanolic hydrochloric acid to reflux to yield 17α-ethynylestr-4-en-17β-ol-3-one.

10. The process of claim 2 wherein the starting material is estra-4,9,11-triene-3,17-dione and the 17α-ethynyl-17β-hydroxy steroid is 17α-ethynylestra-4,9,11-trien-17β-ol-3-one.

11. The process of claim 2 including the step of acidifying the reaction product with aqueous acid selected from the group comprising of sulfuric acid, hydrochloric acid and acetic acid.

12. The process of claim 11 wherein the 17-keto steroid is 3-methoxyestra-2,5(10)-dien-17-one and the 17α-ethynyl-17β-hydroxy steroid is 17α-ethynylestr-5(10)-en-17β-ol-3-one.

13. The process of claim 11 wherein the 17-keto steroid is 3,3-dimethoxyestr-5(10)-en-17-one and the 17α-ethynyl-17β-hydroxy steroid is 17α-ethynylestr-5(10)-en-17β-ol-3-one.

14. The process of claim 11 wherein the 17-keto steroid is 3-ethoxyestra-3,5-dien-17-one and the 17α-ethynyl-17β-hydroxy steroid is 17α-ethynylestr-5-en-17β-ol-3-one.

15. The process of claim 2 including heating the reaction product of the ethynylation in methanolic hydrochloric acid, and further characterized in that said 17-keto steroid is androst-4-ene-3,17-dione-19-oic acid and the product after said heating is 17α-ethynylestr-4-en-17β-ol-3-one.

16. The process for the preparation of 17α-ethynylestr-4-en-17β-ol-3-one which comprises treating a mixture of either androst-4-en-19-al-3,17-dione or androst-4-en-19-ol-3,17-dione, dimethylsulfoxide, sodium methoxide and an inert nonaqueous organic solvent with acetylene; acidifying the reaction product with aqueous hydrochloric acid; and then heating the product of said acidification to reflux in methanolic hydrochloric acid.

17. The process of claim 16 wherein the starting material is androst-4-en-19-al-3,17-dione.

18. The process of claim 16 wherein the starting material is androst-4-en-19-ol-3,17-dione.

References Cited

UNITED STATES PATENTS

| | | | |
|---|---|---|---|
| 2,806,030 | 9/1957 | Ringold et al. | 260—239.55 |
| 2,888,471 | 5/1959 | Sondheimer et al. | 260—397.4 |
| 3,332,968 | 7/1967 | Joly et al. | 260—397.3 |

LEWIS GOTTS, Primary Examiner

ETHEL G. LOVE, Assistant Examiner

U.S. Cl. X.R.

260—239.55, 397.5, 397.45, 632

UNITED STATES PATENT OFFICE
CERTIFICATE OF CORRECTION

Patent No. 3,470,217          Dated September 30, 1969

Inventor(s) Robert Ginsig

It is certified that error appears in the above-identified patent and that said Letters Patent are hereby corrected as shown below:

Column 1, line 30, "methylphentyn" should read --methylpentyn--.

Column 7, line 16, in Claim 8, "3β-ol-17-one" should read --3,17-dione--.

Column 8, line 15, in Claim 16, "of" should read --ol--.

Column 8, lines following 25, the references cited should appear as follows:

| | | | |
|---|---|---|---|
| 2,365,898 | 12/1944 | Morris et al. | 167-82 |
| 2,806,030 | 9/1957 | Ringold et al. | 260-23 |
| 2,888,471 | 5/1959 | Sondheimer et al. | 260-39 |
| 2,996,552 | 8/1961 | Blumenthal | 260-61 |
| 3,126,376 | 3/1964 | Robinson | 260-23 |
| 3,242,197 | 3/1966 | Windholz et al. | 260-39 |
| 3,318,928 | 5/1967 | Anner et al. | 260-39 |
| 3,332,968 | 7/1967 | Joly et al. | 260-39 |

SIGNED AND SEALED

JUN 30 1970

WILLIAM E. SCHUYLER, JR.
Commissioner of Patents